No. 897,694. PATENTED SEPT. 1, 1908.
W. O. WORTH.
SPRING SUSPENSION.
APPLICATION FILED NOV. 21, 1906.
2 SHEETS—SHEET 1.
Fig. 1
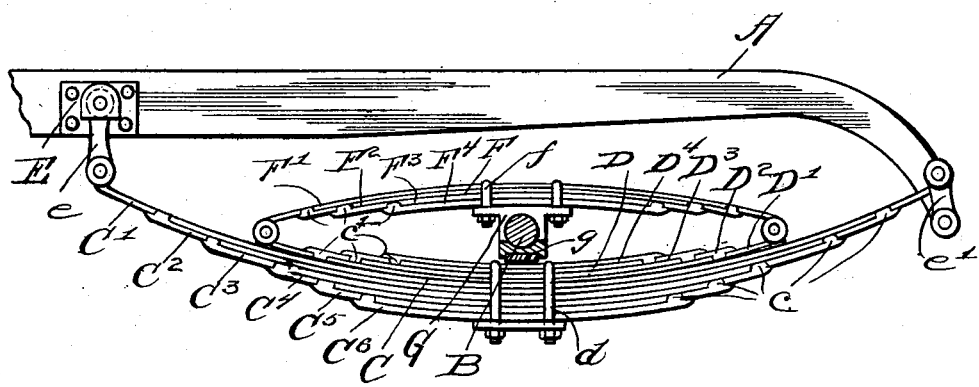
Fig. 2
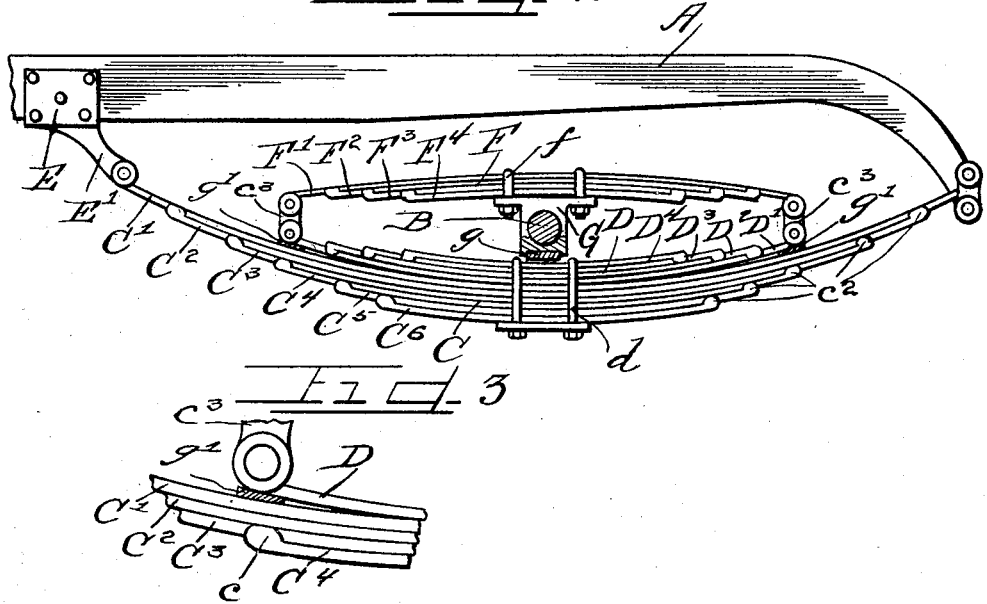
Fig. 3
Witnesses
J. W. Angell
N. E. Hannah
Inventor
William O. Worth
by Charles W. ____
Att'y

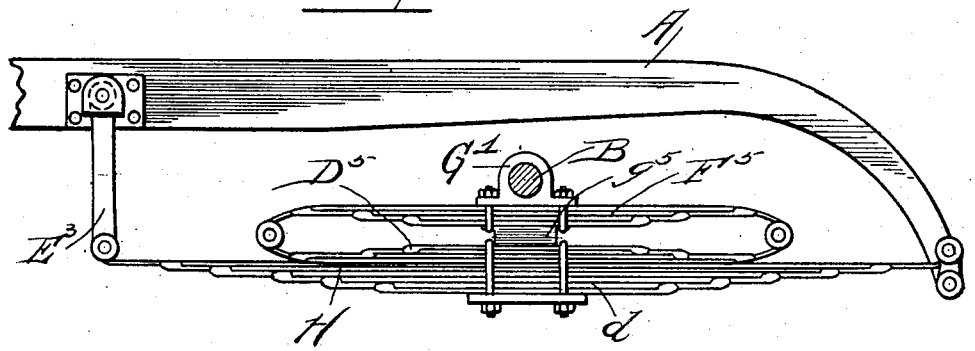
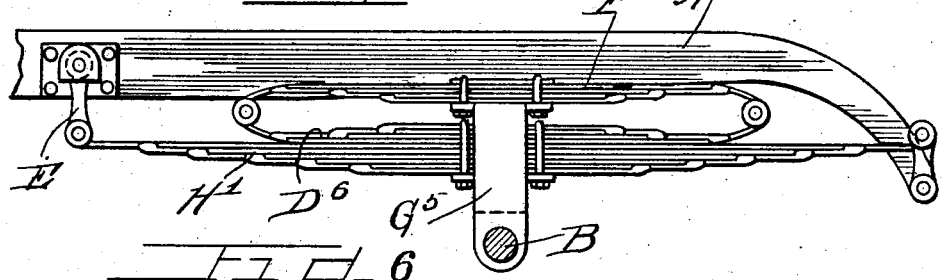
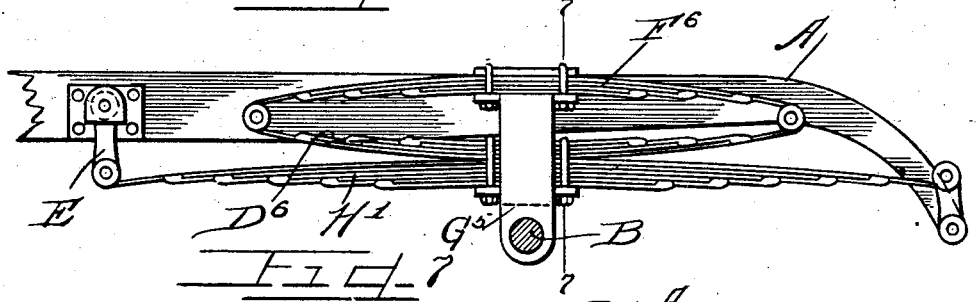
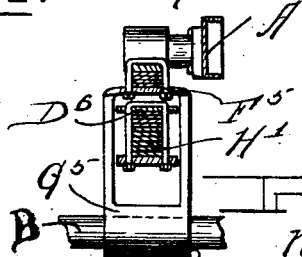

UNITED STATES PATENT OFFICE.

WILLIAM O. WORTH, OF EVANSVILLE, INDIANA.

SPRING SUSPENSION.

No. 897,694.   Specification of Letters Patent.   Patented Sept. 1, 1908.

Application filed November 21, 1906. Serial No. 344,427.

*To all whom it may concern:*

Be it known that I, WILLIAM O. WORTH, a citizen of the United States, and a resident of the city of Evansville, in the county of Vanderburg and State of Indiana, have invented certain new and useful Improvements in Spring Suspensions; and I do hereby declare that the following is a full, clear, and exact description of the same, reference being had to the accompanying drawings, and to the letters of reference marked thereon, which form a part of this specification.

This invention relates to improvements in spring suspensions and more particularly to a spring suspension adapted for vehicle use.

Heretofore the springs for vehicles have usually been engaged directly between the axle and body lying wholly above the axle and transmit even under the best conditions considerable of the jar and shock received from the axle directly to the body of the vehicle to the annoyance and discomfort of the occupants or injury to the load when the roads are rough.

It is an object of the invention to provide a spring suspension for vehicles or other purposes in which multiple springs, each composed of a plurality of sections are so constructed and arranged that all shocks are indirectly transmitted through the spring sections and are thereby absorbed before reaching the body.

Another object of the invention is to provide a spring in which the shock is distributed over a plurality of grouped sections, each group acting to absorb a part of the shock and vibration imparted from the preceding group.

A very important object of the invention is not only to absorb all shock if possible by means of the springs but what is fully as important to distribute any jar or shock not fully absorbed by the springs uniformly to all parts of the vehicle body instead of that portion just above the axles only.

It is finally an object of the invention to provide cheap, simple and exceedingly durable springs for the purposes described which can be quickly applied to any vehicle and when applied serve as a spring and also as a shock absorber.

The invention consists in the matters hereinafter described and more fully pointed out and defined in the appended claims.

On the drawings: Figure 1 is a side view of a spring and spring suspension embodying my invention. Fig. 2 is a similar view of a slightly modified form of a spring embodying my invention. Fig. 3 is an enlarged fragmentary detail of the same showing the pad in section. Fig. 4 is a side elevation of the spring showing the same supported below the axle. Fig. 5 is a similar view showing the same supported above the axle. Fig. 6 is a similar view showing the spring under compression. Fig. 7 is a section on line 7—7 of Fig. 6.

As shown in said drawings: A represents the side sill of a vehicle such as an automobile or any desired kind of vehicle and B, one of the axles with which said sill is connected by the spring. Rigidly engaged on said sill at any convenient position is a plate or casing E, provided with a downwardly opening pocket. Pivotally engaged in said pocket is a depending link $e$, and pivotally engaged on the adjacent extremity of the sill is a link $e'$, which extends upwardly. Said links $e$—$e'$, pivotally engage the ends of the longest leaf $C'$ of a semi-elliptical spring section C comprising a plurality of leaves $C'$ to $C^6$ inclusive of which the leaves decrease in length downwardly and at the ends thereof laterally and upwardly directed lips $c$ between which the next longer leaf above lies, may or may not be provided. Supporting said spring section C and to which the same is rigidly secured thereto by U bolts $d$, is a shorter auxiliary section D, comprising a long outer main leaf $D'$, and a plurality of successively shorter upper and inner leaves $D^2$ to $D^4$, inclusive, which also may or may not be provided with lateral lips $c'$, corresponding with the lips $c$ before described and serving a similar purpose.

Secured on the axle B, is a bearing clip G, through which the axle extends and the top of which is extended to afford a seat for the upper spring section F, which is secured thereto at its middle by U bolts $f$. Said spring section F comprises a long outer leaf $F'$ pivotally engaged at its ends with the ends of the leaf $D'$ of the spring section D and successively shorter inner leaves $F^2$ to $F^4$ inclusive near the extremities of which may be provided lateral lips or flanges $c'$, corresponding with those before described and serving the same purpose.

The spring as shown in Fig. 2, is similar to that shown in Fig. 1 with the exception that the bracket or hanger $E'$ for the inner end of the leaf $C'$ is integral with the plate E, and the lips or flanges $c^2$ engaging at the sides of the leaves are rounded and positioned at the extremities of the respective leaves. As shown also the ends of the spring sections D and F are pivotally connected by links $c^3$.

The construction shown in Fig. 4 illustrates a simple variation of attachment the section $F^5$ being secured to the bearing $G'$ and lying below the axle. In this construction the sections $F^5$—$D^5$, and the main section H are straight normally, the end of the section H is connected with the sill A, by means of a long link $E^3$.

The arrangement shown in Figs. 5—6 and 7 illustrate the springs supported wholly above the axle B. To enable this to be done a bearing is secured on the axle and extends upwardly on each side the spring and is rigidly clamped to the upper section at its middle. Said bearing clamp is of a length to afford sufficient play for the lower sections $H'$ and $D^6$, which are constructed as before described, except that the same are normally straight as shown in Figs. 5 and 6. No pads of any kind are required except the pad $q^5$ between the sections $F^5$ and $D^5$ shown in Fig. 4, inasmuch as the sections $D^6$, and $H'$, in Figs. 5, 6, and 7 can never close as they bend oppositely from a common center.

The operation is as follows: Any obstruction in the road which throws the axle upwardly imparts its shock first to the spring section F, the middle of which is bowed up somewhat by the upward stress on the axle while the weight of the body being carried centrally on the section D and acting oppositely from the axle the ends thereof are sprung upwardly and away from the body spring C, the middle of which may also with large obstructions be sprung upwardly somewhat though ordinarily the sections F—D do practically all the work except that the long body spring C absorbs stresses too great to be absorbed by the other sections. Of course the section D is sprung away from the section C on the upward movement of the axle both springs being fixed in the direction of their greatest resistance in consequence when the obstruction is passed the downward movement of the axle is entirely absorbed by the quick return of the springs to normal and the body is thus carried without vibration or appreciable vibration even on rough roads though the car be driven at a high rate of speed.

Inasmuch as the upper spring section F is rigidly secured to and supported centrally on the axle and is connected at its ends with the section D which extends below the axle and on which the weight of the body is carried the greater part of the shock is absorbed thereby and by the auxiliary spring section D. The inner leaves of the elliptical spring formed by said two sections F and D may contain any number of leaves to impart the required strength to the spring and enable it to absorb practically all the ordinary shocks received on the axle. Only a very small amount of the shock is ever transmitted to the body of the vehicle through the spring sections C and that is distributed over a large area owing to the length of said section affording bearings for the frame at such greater distance from the axle than is possible in other springs.

The danger of breakage from the recoil from severe shocks is obviated inasmuch as the recoil is always limited by the presence of the axle, clip and butting pad $g$ between the sections D and F, and also by the coaction of the ends of the section D and its butting blocks $g'$. The link connections between the spring section C and the frame or between the spring sections D and F insure each section acting with maximum efficiency independently and the shock from starting, sudden stopping, backing, etc., is also more readily absorbed. Of course, the butting blocks or pads of rubber $g$—$g'$ may be placed between the bottom of the clip G and the spring section D and between the ends of the latter and the spring section C, to prevent clashing or any expedient may be resorted to for that purpose though the sections C and D, $D^5$—H or $D^6$—$H'$, can never clash inasmuch as they act oppositely from a common center. The number of leaves and manner of arranging and engaging the same may be varied and the pivotal connections between the sections may be of any suitable kind and the springs may be engaged wholly above the axle or wholly below the axle or partly above and partly below the axle and the connections for engaging the spring to the vehicle may be varied, and the pads may be omitted or arranged where and of any kind desired, I therefore do not purpose limiting this application for patent as to details as they may be varied without departing from the principles of this invention.

I claim as my invention:—

1. A spring suspension of the class described embracing a long semi-elliptical body spring and a shorter elliptical spring having one section rigidly bolted to the same and the upper section of the elliptical spring connected directly with the axle.

2. A spring suspension of the class described embracing a long body spring connected at its ends with the frame, a spring comprising oppositely disposed sections, each having leaves decreasing in length inwardly, one of said sections shaped for approximately its entire length, complementally with the long body spring and rigidly secured thereto and means connecting the other section with the axle.

3. A spring suspension of the class described embracing a long body spring extending below the axle, a spring connecting the same centrally with the axle and pads engaged between the body spring and the ends of said last named spring.

4. A spring suspension of the class described embracing a long body spring extending below the axle and a spring connecting the same centrally with the axle, a butting block between the body spring and axle and a butting block between the body spring and each end of the other spring.

5. A spring suspension embracing a long body spring consisting of a plurality of leaves, a spring consisting of oppositely disposed sections, positioned above said body spring, said sections having inwardly facing leaves, means connecting one section to the lower body spring and means connecting the other section with the axle.

6. A spring suspension embracing a long body spring consisting of a single section, a depending link pivotally connected to the body at one end and pivotally engaging one end of said body spring, an upwardly directed link pivotally connected to the body and at its upper end pivotally connected to the other end of the body spring, and pivotally connected spring sections having inwardly facing leaves, concave on their sides adjacent the axle, one of said sections rigidly connected to the axle and the other directly connected to the long body spring.

7. A spring suspension embracing an elliptical supporting spring, a body spring of greater length secured thereon, means pivoting the body spring at each end to the frame to afford a swinging movement and means adapted to absorb the impact between said elliptical and body springs.

8. A spring suspension embracing an elliptical supporting spring and a body spring comprising a section of greater length than the elliptical spring and secured thereon centrally and links pivoted to the body, one depending from said body and the other directed upwardly and the lower and upper ends of said links pivotally connected with the ends of said body spring.

9. A spring suspension embracing an elliptical supporting spring each section having leaves decreasing in length inwardly and adapted to be centrally engaged on an axle and a body spring engaged centrally to said supporting spring and adapted to be engaged at its ends to a vehicle body and comprising leaves arranged to resist upward pressure at its middle.

10. A spring suspension embracing a body spring consisting of one section adapted to be pivotally engaged at its ends to a vehicle body, a double elliptical supporting spring supported on the axle on one side and at the other rigidly engaged centrally to the center of said body spring the sections thereof having inwardly arranged leaves.

11. A spring suspension embracing an elliptical supporting spring comprising a plurality of sections one on each side the axle and the upper of which is secured on the axle and each comprising a plurality of inwardly disposed leaves and a longer body spring consisting of a single section engaged centrally to the lower section and having downwardly disposed leaves said section at its ends pivoted to the frame.

12. A spring suspension embracing an elliptical supporting spring comprising a plurality of sections one on each side the axle and the upper of which is secured on the axle and each comprising a plurality of inwardly disposed leaves and a longer body spring engaged centrally to the lower section and having downwardly disposed leaves, and means engaged between said spring sections to absorb the impact.

13. The combination with the body and axle of an elliptical spring comprising an upper section secured on the axle and a lower section connected on the ends thereof and extending below the axle a longer half elliptical body spring connected centrally to the lower section of the supporting spring and links pivotally engaging the body spring at its ends to the body and pads for absorbing the impact of said springs.

14. A spring suspension embracing an elliptical supporting spring comprising sections each having a plurality of inwardly arranged leaves, an axle extending between the same and on which the upper section is secured, a half elliptical spring connected at its middle with the lower section of the supporting spring and comprising a plurality of downwardly arranged leaves, links pivotally connected to the ends of the half elliptical spring and means on said leaves for preventing relative lateral movement of the leaves.

15. A spring suspension embracing oppositely disposed sections having inwardly arranged leaves, a body spring supported thereon, lips or flanges on the ends of said leaves adapted to prevent lateral movement of the same and resilient pads arranged between adjacent spring sections.

In testimony whereof I have hereunto subscribed my name in the presence of two subscribing witnesses.

WILLIAM O. WORTH.

Witnesses:
K. E. HANNAH,
G. W. DANZ.